(12) United States Patent
Wang et al.

(10) Patent No.: US 7,568,225 B2
(45) Date of Patent: Jul. 28, 2009

(54) SYSTEM AND METHOD FOR REMOTE SECURITY ENABLEMENT

(75) Inventors: Lan Wang, Cypress, TX (US); Jennifer Rios, Spring, TX (US); Valiuddin Ali, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 871 days.

(21) Appl. No.: 10/936,918

(22) Filed: Sep. 8, 2004

(65) Prior Publication Data

US 2006/0053277 A1    Mar. 9, 2006

(51) Int. Cl.
G06F 21/00 (2006.01)

(52) U.S. Cl. .................. 726/17; 726/4; 726/21; 713/1; 713/2; 713/100; 713/185; 713/193

(58) Field of Classification Search .......... 726/4, 726/17, 21; 713/1, 2, 100, 193, 185
See application file for complete search history.

(56) References Cited

U.S. PATENT DOCUMENTS

| | | | | |
|---|---|---|---|---|
| 5,454,110 | A * | 9/1995 | Kannan et al. ............ | 713/2 |
| 5,826,007 | A | 10/1998 | Sakaki et al. | |
| 6,009,524 | A | 12/1999 | Olarig et al. | |
| 6,223,284 | B1 * | 4/2001 | Novoa et al. .............. | 713/100 |
| 6,282,642 | B1 | 8/2001 | Cromer et al. | |
| 6,418,533 | B2 * | 7/2002 | Angelo et al. ............. | 726/19 |
| 6,535,976 | B1 * | 3/2003 | Hoggarth et al. .......... | 713/2 |
| 6,662,023 | B1 * | 12/2003 | Helle ....................... | 455/558 |
| 6,715,070 | B1 * | 3/2004 | Peloquin et al. .......... | 713/1 |
| 6,799,277 | B2 * | 9/2004 | Colvin ..................... | 726/22 |
| 6,931,503 | B1 * | 8/2005 | Robb et al. ............... | 711/163 |
| 6,941,518 | B2 * | 9/2005 | French et al. ............. | 715/736 |
| 7,107,460 | B2 * | 9/2006 | Cromer et al. ............ | 713/193 |
| 7,343,493 | B2 * | 3/2008 | Challener et al. ......... | 713/193 |
| 7,343,560 | B1 * | 3/2008 | Tanner et al. ............. | 715/735 |
| 7,424,610 | B2 * | 9/2008 | Ranganathan ............. | 713/164 |
| 2002/0087877 | A1 | 7/2002 | Graw rock | |
| 2002/0120575 | A1 * | 8/2002 | Pearson et al. ............ | 705/51 |
| 2003/0084285 | A1 | 5/2003 | Cromer et al. | |
| 2003/0159056 | A1 | 8/2003 | Cromer et al. | |
| 2003/0163711 | A1 * | 8/2003 | Grawrock ................. | 713/189 |
| 2003/0188179 | A1 * | 10/2003 | Challener et al. ......... | 713/193 |
| 2003/0221114 | A1 | 11/2003 | Hino et al. | |
| 2004/0003288 | A1 | 1/2004 | Wiseman et al. | |
| 2004/0103299 | A1 | 5/2004 | Zimmer et al. | |

(Continued)

FOREIGN PATENT DOCUMENTS

EP    1085396    3/2001

(Continued)

OTHER PUBLICATIONS

Sundeep Bajikar; "Trusted Platform Module (TPM) based Security on Notebook PCs—White Paper"; Mobile Platforms Group Intel Corporation; Jun. 20, 2002; pp. 1-20.*

(Continued)

*Primary Examiner*—Carl Colin

(57) ABSTRACT

A system for remote security enablement comprises a trusted platform module (TPM) disposed on a user client and an administration client adapted to access, via a communication network, the user client to cause enablement of the TPM on a subsequent boot of the user client.

31 Claims, 2 Drawing Sheets

U.S. PATENT DOCUMENTS

| | | | |
|---|---|---|---|
| 2004/0151319 A1* | 8/2004 | Proudler | 380/277 |
| 2005/0033987 A1* | 2/2005 | Yan et al. | 713/201 |
| 2005/0039013 A1* | 2/2005 | Bajikar et al. | 713/172 |
| 2005/0058294 A1* | 3/2005 | Chen et al. | 380/277 |
| 2005/0289347 A1* | 12/2005 | Ovadia | 713/171 |
| 2006/0053277 A1* | 3/2006 | Wang et al. | 713/2 |
| 2007/0255948 A1* | 11/2007 | Ali et al. | 713/164 |

FOREIGN PATENT DOCUMENTS

| | | |
|---|---|---|
| JP | 08-212110 | 8/1996 |
| JP | 2002358137 | 12/2002 |

OTHER PUBLICATIONS

Trusted Computing Group; "Trusted Platform Module Specification v1.2 Enhances Security"; Jun. 2004; pp. 1-6.*

Zheng Yan and Piotr Cofta; "A Mechanism for Trust Sustainability among Trusted Computing Platforms"; In Proceedings of the 1st International Conference on Trust and Privacy in Digital Business (TrustBus2004), pp. 1-11.*

Patent Office-Japan, Office Action dated Nov. 21, 2008, for Application No. 2005-258991; pp. 1-2.

Patent Office-China, Office Action dated Oct. 31, 2008, for Application No. 200510099908.3; pp. 1-6.

Patent Office-United Kingdom, Search and Examination Report dated Aug. 27, 2008 for Application No. GB0807489.0; pp. 1-4.

* cited by examiner

SYSTEM AND METHOD FOR REMOTE SECURITY ENABLEMENT

BACKGROUND

To securely enable a trusted platform module (TPM) on a computer system, standardized specifications of the Trusted Computing Group (TCG) mandate that a physical user presence be established at the computer system to maintain security and user privacy rights of the computer system and ensure that a rogue software entity (i.e., a virus) does not automatically enable the TPM automatically. In a networked computer environment, TPM enablement is generally accomplished by a system administrator via a basic input/output system (BIOS) administrative console on the computer system. Thus, enabling TPMs in a networked computer environment is a time-consuming and extensive process requiring that the system administrator physically visit each user or client computer system.

SUMMARY OF THE INVENTION

In accordance with one embodiment of the present invention, a system for remote security enablement comprises a trusted platform module (TPM) disposed on a user client and an administration client adapted to access, via a communication network, a TPM enablement module disposed on the user client to cause enablement of the TPM on a subsequent boot of the user client.

In accordance with another embodiment of the present invention, a remote security enablement method comprises establishing a communication session between a user client and an administration client via a communication network and enabling the administration client to cause enablement of a trusted platform module (TPM) on the user client on a subsequent boot of the user client.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
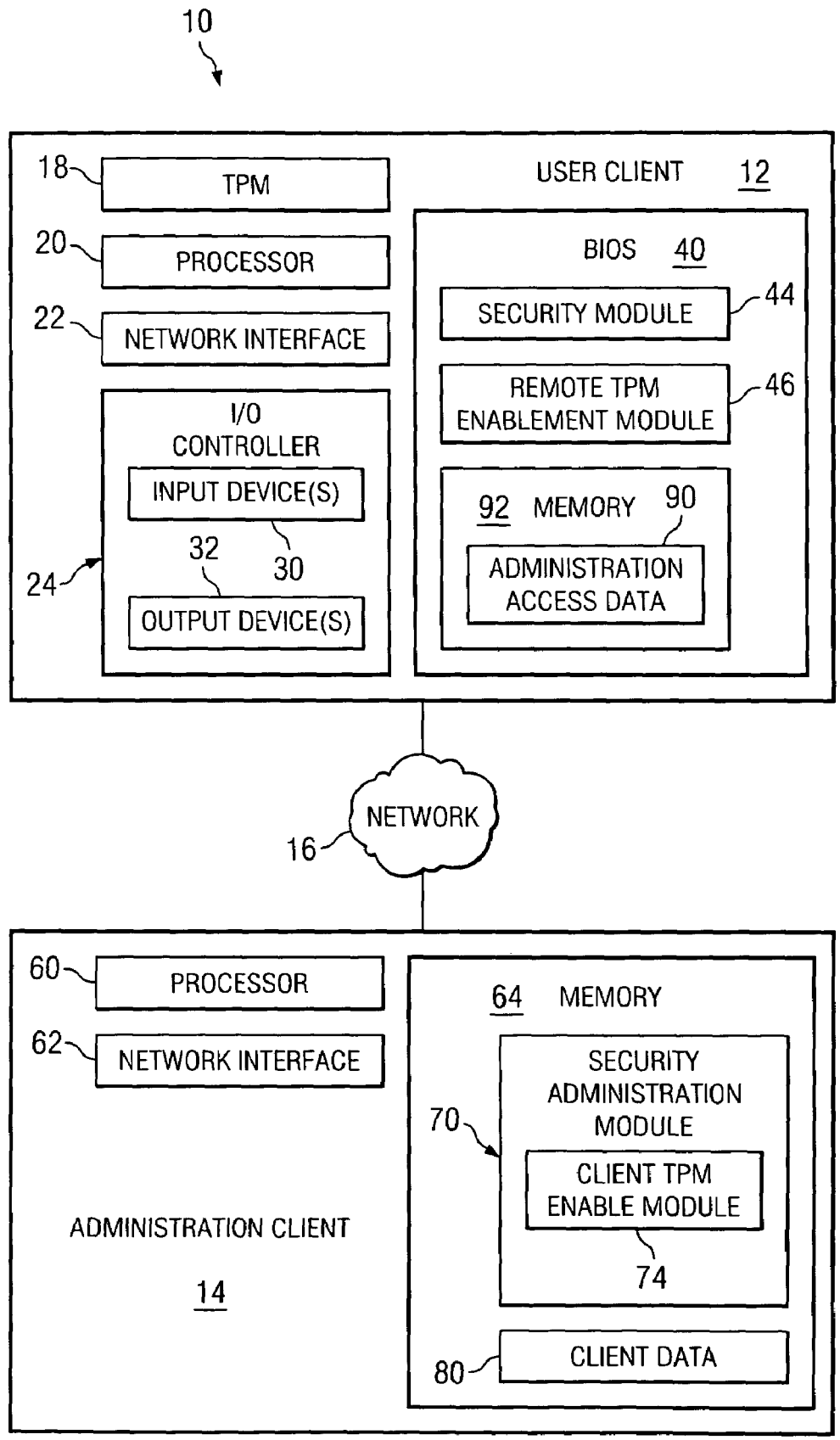
FIG. 1 is a diagram illustrating an embodiment of a remote security enablement system in accordance with the present invention.
Figure 2:
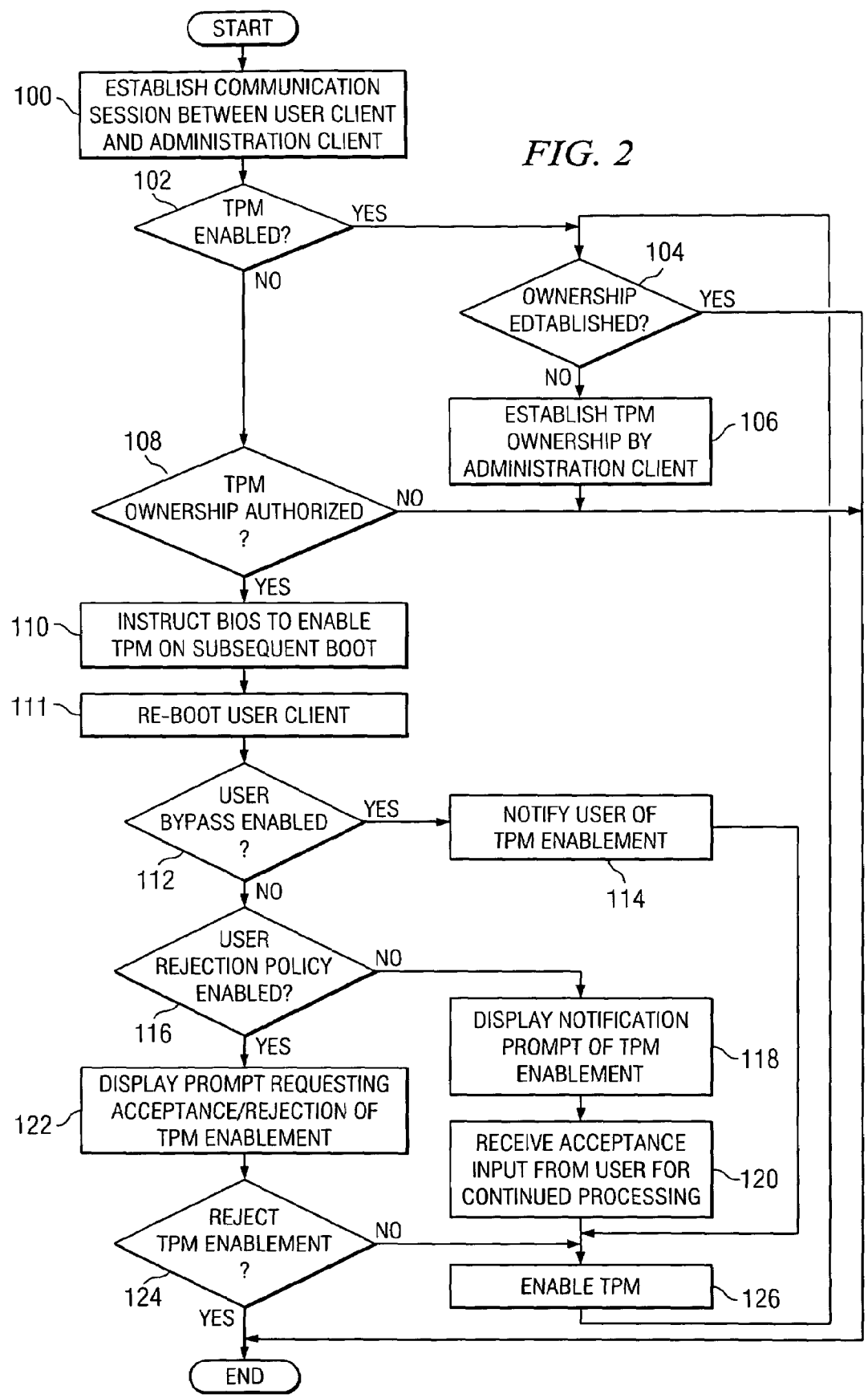
FIG. 2 is flow diagram illustrating a method for remote security enablement in accordance with an embodiment of the present invention.

The preferred embodiments of the present invention and the advantages thereof are best understood by referring to FIGS. 1 and 2 of the drawings, like numerals being used for like and corresponding parts of the various drawings.

FIG. 1 is a diagram illustrating an embodiment of a remote security enablement system 10 in accordance with the present invention. In the embodiment illustrated in FIG. 1, system 10 comprises a user client 12 coupled to an administration client 14 via a communication network 16. Communication network 16 may comprise any type of wired or wireless network now known or later developed. Briefly, system 10 enables remote enablement of a trusted platform module (TPM) 18 disposed on user client 12 by administration client 14. In FIG. 1, a single user client 12 is illustrated. However, it should be understood that embodiments of the present invention enable remote enablement of a TPM disposed on each of multiple networked user clients.

In the embodiment illustrated in FIG. 1, client 12 comprises a processor 20, a network interface 22, and an input/output (I/O) controller 24. Network interface 22 enables communications between user client 12 and administration client 14 via communication network 16. I/O controller 24 enables control of input device(s) 30 and output device(s) 32 for receiving information from a user of client 12 and outputting information to a user of client 12, respectively. Input device(s) 30 may comprise a keyboard, mouse, track pad, modem, microphone, or any other type of device for inputting information to client 12. Output device(s) 32 may comprise a display monitor, speaker(s), a printer, or any other type of device for outputting information from client 12.

As illustrated in FIG. 1, system 10 also comprises a basic input/output system (BIOS) 40 for performing booting or starting operations such as system initialization and tests, and peripheral component registration operations. For example, upon booting or starting of client 12, processor 20 passes control to BIOS 40 to identify and ascertain the hardware and software resources connected to, or forming a part of, client 12. BIOS 40 also generally verifies that the connected hardware components are properly working and loads all or a portion of an operating system.

In the embodiment illustrated in FIG. 1, BIOS 40 comprises a security module 44 and a remote TPM enablement module 46. Security module 44 and remote TPM enablement module 46 may comprise hardware, software, or a combination of hardware and software. Briefly, security module 44 is used to verify or authenticate the identity of a user of client 12 and/or the identity of administration client 14 accessing or otherwise communicating with client 12. Remote TPM enablement module 46 is used to enable TPM 18 in response to instructions and/or policies received from administration client 14. In FIG. 1, security module 44 and remote TPM enablement module 46 are illustrated as components of BIOS 40; however, it should be understood that security module 44 and/or remote TPM enablement module 46 may be otherwise stored, located and/or accessible on client 12.

In the embodiment illustrated in FIG. 1, administration client 14 comprises a processor 60, a network interface 62, and a memory 64. Network interface 62 enables communications between administration client 14 and user client 12 via communication network 16. As illustrated in FIG. 1, administration client 14 also comprises a security administration module 70. Security administration module 70 may comprise software, hardware, or a combination of software and hardware. In FIG. 1, security administration module 70 is illustrated as being stored in memory 64 so as to be accessible and executable by processor 60. However, it should be understood that security administration module 70 may be otherwise stored, even remotely, so as to be accessible and executable by processor 60.

Security administration module 70 is used to control and/or authorize access to security functions and policies associated with user client 12. For example, in the embodiment illustrated in FIG. 1, security administration module 70 comprises a client TPM enable module 74 for interfacing with user client 12 to remotely enable TPM 18 of user client 12. In the embodiment illustrated in FIG. 1, administration client 14 also comprises client data 80 stored in memory 64 having information associated with client 12 such as, but not limited to, user information of user client 12 and/or security information for accessing user client 12. Security administration module 70 accesses and/or otherwise uses client data 80 to identify and/or otherwise access a particular user client 12.

Thus, in operation, a user of administration client 14 accesses or otherwise uses client TPM enable module 74 to communicate with a particular user client 12 via communication network 16 to request enablement of TPM 18 of a particular user client 12. For example, in operation, security administration module 70 interfaces with security module 44 such that access credentials of administration client 14 may be verified and/or otherwise authenticated by security module 44 using administration access data 90 stored in a memory 92 of user client 12. In the embodiment illustrated in FIG. 1, administration access data 90 and memory 92 are illustrated as being a component of BIOS 40. However, it should be understood that administration access data 90 may be otherwise stored on user client 12.

In response to security credential authentication, client TPM enable module 74 interfaces with BIOS 40 to instruct and/or otherwise cause BIOS 40 to enable TPM 18 on a subsequent boot of user client 12 via instructions and/or policies set forth or otherwise identified by remote TPM enablement module 46 and/or client TPM enable module 74. In some embodiments of the present invention, BIOS 40 and/or remote TPM enablement module 46 are configured to immediately initiate a re-boot of user client 12 in response to a TPM enablement request by administration client 14. However, it should be understood that in other embodiments of the present invention, a re-boot of user client 12 may be delayed and/or user-directed or controlled. Thus, on a subsequent boot of user client 12, remote TPM enablement module 46 is accessed or otherwise used by BIOS 40 to enable TPM 18 and provide a user of user client 12 with various options for acceptance, rejection, or notice of TPM 18 enablement as desired by the user of administration client 14.

In operation, based on a desired policy or setting requested by administration client 14 via client TPM enable module 74, administration client 14 provides one or more desired option or control settings for enabling TPM 18 on the subsequent boot of user client 12. In some embodiments of the present invention, remote TPM enablement module 46 is configured to cooperate with output device(s) 32 to display or otherwise indicate to a user of client 12 notification that TPM 18 is being enabled but not requiring an input response or any other action by the user. For example, remote TPM enablement module 46 may be configured to cooperate with output device(s) 32 to display a notification of TPM 18 enablement via output device(s) 32, such as a display monitor, and then continue with TPM 18 enablement. In other embodiments of the present invention, remote TPM enablement module 46 is configured to cooperate with output device(s) 32 to display a prompt to a user of client 12 notifying the user of client 12 of TPM 18 enablement and requiring an input response from the user of client 12 to continue with the enablement and/or boot process. For example, remote TPM enablement module 46 may cooperate with output device(s) 32 to display a prompt on output device(s) 32 notifying the user of client 12 of TPM 18 enablement and request that the user acknowledge TPM 18 enablement by providing an input response, such as via input device 30, to continue processing or operations on user client 12 (e.g., if acknowledgement is not received, the user is unable to boot or otherwise utilize or continue operations on user client 12).

In other embodiments of the present invention, remote TPM enablement module 46 is configured to cooperate with output device(s) 32 to display a prompt to a user of client 12 notifying the user of client 12 of TPM 18 enablement and providing the user with the option of either accepting or rejecting TPM 18 enablement. For example, remote TPM enablement module 46 may cooperate with output device(s) 32 to display a prompt to a user of client 12 requesting that the user of client 12 either accept or reject TPM 18 enablement by providing an input response, such as via input device 30. Based on the input response received from the user, remote TPM enablement module 46 either continues with TPM 18 enablement or aborts TPM 18 enablement. In the examples described above, display prompts indicating TPM 18 enablement are provided before TPM 18 enablement. However, it should also be understood that display prompts indicating or otherwise notifying the user of TPM 18 enablement may also be provided after TPM 18 enablement as an alternative or in combination with the pre-enablement notices.

FIG. 2 is a flow diagram illustrating a method for remote TPM enablement in accordance with an embodiment of the present invention. The method begins at block 100, where a communications session is established between user client 12 and administration client 14. As described above, security administration module 70 interfaces with security module 44 of BIOS 40 to authenticate or otherwise authorize access to user client 12 by administration client 14 (e.g., access to BIOS 40 and/or TPM 18). At decisional block 102, client TPM enable module 74 interfaces with BIOS 40 and/or TPM 18 to determine whether TPM 18 is enabled. If TPM 18 is enabled, the method proceeds to decisional block 104, where client TPM enable module 74 interfaces with TPM 18 to determine an ownership state of TPM 18 as to whether ownership of TPM 18 has been previously established (i.e., from a user of user client 12 or another). If ownership of TPM 18 has been previously established, the method ends. If ownership of TPM 18 has not been previously established, the method proceeds to block 106, where administration client 14 establishes ownership of TPM 18.

At decisional block 102, if TPM 18 is not enabled, the method proceeds to block 108, where client TPM enable module 74 interfaces with BIOS 40 to determine whether remote TPM 18 enabling and/or taking ownership by administration client 14 is enabled or otherwise authorized. If ownership of TPM 18 by administration client 14 is not authorized, the method ends. If remote TPM 18 enabling and/or taking ownership by administration client 14 is enabled or otherwise authorized, the method proceeds to block 110.

At block 110, client TPM enable module 74 requests enablement of TPM 18 by instructing or otherwise causing BIOS 40 to enable TPM 18 on a subsequent boot of client 12 using instructions and/or policies set forth by TPM enablement module 46 as selected or otherwise identified by client TPM enable module 74. At block 111, a re-boot or subsequent boot of user client 12 is initiated. At decisional block 112, during the subsequent boot of client 12, BIOS 40 determines whether a user bypass of TPM 18 enablement has been enabled according to remote TPM enablement module 46 such that TPM 18 is enabled without requiring any action on the part of a user of client 12 or providing the user with the option of accepting/rejecting TPM 18 enablement. For example, as described above, client TPM enable module 74 may be configured to set forth or otherwise control various administration policies for TPM 18 enablement on user client 12. If a user bypass policy is enabled at decisional block 112 (i.e., the user is not given the option of accepting/rejecting TPM 18 enablement), the method proceeds to block 114, where remote TPM enablement module 46 notifies a user of user client 12 TPM 18 enablement. The method then proceeds to block 126, where BIOS 40 enables TPM 18. If a user bypass is not enabled at decisional block 112, the method proceeds to decisional block 116, where a determination is made whether a user rejection policy is enabled. For example, as described above, remote TPM enablement module 46 may be configured to provide the user of client 12 the option of rejecting enablement of TPM 18. If a user rejection policy is not enabled at decisional block 116, the method proceeds to block 118, where remote TPM enablement module 46 displays a notification prompt to the user of client 12 of a TPM 18 enablement. For example, as described above, remote TPM enablement module 46 may be configured to display a prompt via output device 32 notifying the user of client 12 of TPM 18 enablement and instructing the user of client 12 to provide an input response to the notification prompt to continue processing on client 12, thereby indicating acceptance of TPM 18 enablement and enabling the user to continue to use or boot user client 12. Thus, at block 120, remote TPM enablement module 46 receives an acceptance input from the user of client 12, such as via input device 30, indicating acceptance of TPM 18 enablement and for continued processing on client 12. The method proceeds to block 126, where TPM 18 is enabled. The method proceeds to decisional block 104.

If a user rejection policy is enabled at decisional block 116, the, method proceeds to block 122, where remote TPM enablement module 46 displays a prompt, such as via output device 32, requesting either acceptance or rejection of TPM 18 enablement. At decisional block 124, a determination is made whether the user of client 12 accepted or rejected TPM 18 enablement. If the user response indicated a rejection of TPM 18 enablement, the method ends. If the user response indicated an acceptance of TPM 18 enablement, the method proceeds to block 126, where BIOS 40 enables TPM 18.

Thus, embodiments of the present invention enable remote enablement of user client TPMs by an administration client and remote deployment of enablement and/or privacy policies controlling or otherwise associated with TPM enablement on the user client 12. It should be understood that in other embodiments of the method described in FIG. 2, certain functions may be omitted, combined, or accomplished in a sequence different than depicted in FIG. 2. Also, it should be understood that the method depicted in FIG. 2 may be altered to encompass any of the other features or aspects described elsewhere in the specification.

What is claimed is:

1. A system for remote security enablement, comprising:
   a trusted platform module (TPM) disposed on a user client;
   an administration client configured to, via a communication network:
      interface with the user client to authorize access to the TPM of the user client by the administration client;
      determine whether the TPM is enabled;
      interface with the TPM to determine whether ownership of the TPM has been previously established;
      where if ownership of the TPM has not been previously established, the administration client establishes ownership of the TPM; and
      where the administration client interfaces with the BIOS of the user client to determine whether taking ownership of the TPM by the administration client is enabled; and
   where the administration client is configured to access, via the communication network, the user client to enable the TPM on a re-boot of the user client, and wherein the user client is configured to request an input from a user of the user client on the re-boot corresponding to enablement of the TPM.

2. The system of claim 1, wherein the administration client is configured to cause the user client to notify the user of the user client that the TPM is being enabled.

3. The system of claim 1, wherein the administration client is configured to cause the user client to display a prompt to the user of the user client requesting acceptance of the TPM enablement.

4. The system of claim 1, wherein the user client is configured to receive an acceptance input from the user of the user client indicating acceptance of the TPM enablement.

5. The system of claim 1, wherein the user client is configured to receive a rejection input from a user of the user client indicating rejection of the TPM enablement.

6. The system of claim 1, wherein the administration client is configured to cause the user client to display a prompt to the user of the user client to enable the user to reject the TPM enablement.

7. The system of claim 1, wherein the administration client is configured to instruct a basic input/output system (BIOS) of the user client to enable the TPM on the re-boot of the user client.

8. The system of claim 1, wherein the administration client is configured to cause the user client to display a prompt to the user of the user client during the re-boot to notify the user of the TPM enablement.

9. The system of claim 1, wherein the user client is configured to indicate to the administration client whether ownership of the TPM has been previously established.

10. The system of claim 1, wherein the user client is configured to enable ownership of the TPM by the administration client.

11. A system for remote security enablement, comprising:
   means for enabling access to a user client by an administration client via a communication network;
   where the administration client is configured to, via the communication network:
      interface with the user client to authorize access to a trusted platform module (TPM) of the user client by the administration client;
      determine whether the TPM is enabled;
      interface with the TPM to determine whether ownership of the TPM has been previously established;
      where if ownership of the TPM has not been previously established, the administration client establishes ownership of the TPM; and
   where the administration client interfaces with the BIOS of the user client to determine whether taking ownership of the TPM by the administration client is enabled; and
   means for enabling the administration client to cause enablement of the trusted platform module (TPM) of the user client on a re-boot of the user client, and wherein the means for enabling enablement of the TPM comprises means for configuring the user client to request an input from a user of the user client on the re-boot corresponding to enablement of the TPM.

12. The system of claim 11, further comprising means for displaying a prompt on the user client requesting the user of the user client to accept the TPM enablement.

13. The system of claim 11, further comprising means for receiving a rejection input by the user of the user client indicating user rejection the TPM enablement.

14. The system of claim 11, further comprising means for receiving an acceptance input from the user of the user client indicating user acceptance of the TPM enablement.

15. The system of claim 11, further comprising means for notifying the user of the user client that the TPM will be enabled on the re-boot of the user client.

16. A remote security enablement method, comprising:
establishing a communication session between a user client and an administration client via a communication network;
enabling the administration client to cause enablement of a trusted platform module (TPM) of the user client on a re-boot of the user client, where the enabling comprises:
  interfacing with the user client to authorize access to the TPM of the user client by the administration client;
  determining whether the TPM is enabled;
  interfacing with the TPM to determine whether ownership of the TPM has been previously established;
  where if ownership of the TPM has not been previously established, establishing ownership of the TPM; and
  where the administration client interfaces with the BIOS of the user client to determine whether taking ownership of the TPM by the administration client is enabled; and
enabling the administration client to configure the user client to request an input from a user of the user client on the re-boot corresponding to enablement of the TPM.

17. The method of claim 16, further comprising displaying a prompt on the user client requesting the user of the user client to accept the TPM enablement.

18. The method of claim 16, further comprising receiving a rejection input by the user of the user client indicating user rejection the TPM enablement.

19. The method of claim 16, further comprising receiving an acceptance input from the user of the user client indicating user acceptance of the TPM enablement.

20. The method of claim 16, further comprising notifying the user of the user client that the TPM will be enabled on the re-boot of the user client.

21. The method of claim 16, further comprising determining an ownership state of the TPM.

22. The method of claim 16, further comprising enabling ownership of the TPM by the administration client.

23. The method of claim 16, further comprising displaying a prompt on the user client notifying the user of the user client of TPM enablement and requesting the user to provide an input response to continue processing on the user client.

24. A system for remote security enablement, comprising:
a remote TPM enablement module disposed on a user client, the remote TPM enablement module configured to cause enablement of a trusted platform module (TPM) of the user client on a re-boot of the user client in response to a TPM enablement request received from an administration client via a communication network,
where the user client is configured to:
  interface with the administrative client to authorize access to a trusted platform module (TPM) of the user client;
  determine whether the TPM is enabled;
  interface with the TPM to determine whether ownership of the TPM has been previously established;
  where if ownership of the TPM has not been previously established, respond to the administration client to establish ownership of the TPM; and
  where a basic input/output system (BIOS) of the user client interfaces with the administration client to determine whether taking ownership of the TPM by the administration client is enabled; and
the remote TPM enablement module configured to apply at least one of a plurality of different policy settings set forth by the administration client for notifying a user of the user client of enablement of the TPM on the re-boot.

25. The system of claim 24, the TPM enablement module configured to display a prompt on the user client notifying the user of the user client of the TPM enablement.

26. The system of claim 24, the TPM enablement module configured to display a prompt on the user client requesting the user of the user client to indicate acceptance of the TPM enablement.

27. The system of claim 24, the TPM enablement module configured to receive an input response from the user of the user client indicating acceptance of the TPM enablement.

28. The system of claim 24, the TPM enablement module configured to receive an input response from the user of the user client indicating rejection of the TPM enablement.

29. The system of claim 24, the user client configured to indicate an ownership state of the TPM to the administration client.

30. The system of claim 24, the user client configured to enable ownership of the TPM by the administration client.

31. The system of claim 24, the remote TPM enablement module configured to initiate the subsequent boot of the user client in response to the enablement request.

* * * * *